May 27, 1958           J. MARTIN           2,836,382

LEG RESTRAINING MEANS FOR EJECTION SEATS FOR AIRCRAFT

Filed Nov. 18, 1953           5 Sheets-Sheet 1

Inventor
JAMES MARTIN
per Worth Wade
Attorney.

May 27, 1958   J. MARTIN   2,836,382
LEG RESTRAINING MEANS FOR EJECTION SEATS FOR AIRCRAFT
Filed Nov. 18, 1953   5 Sheets-Sheet 2
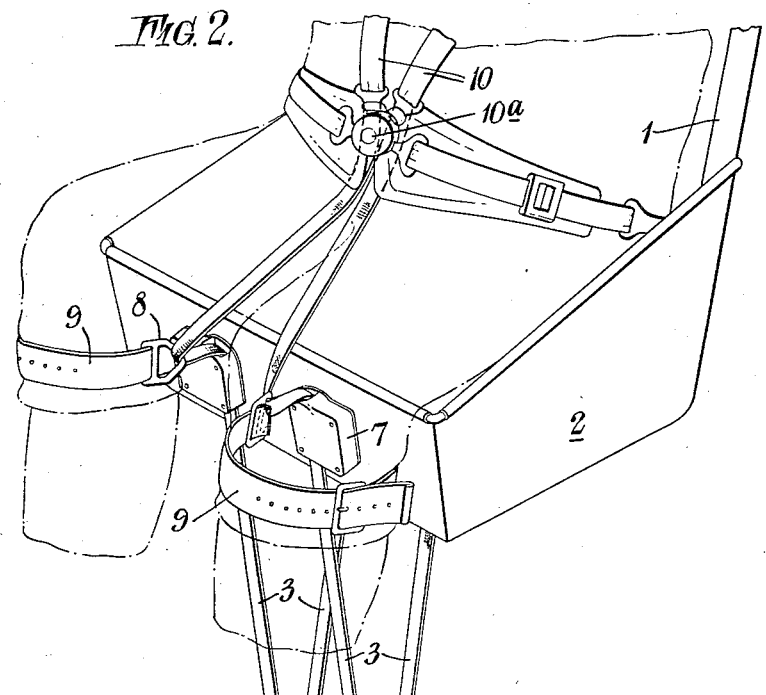
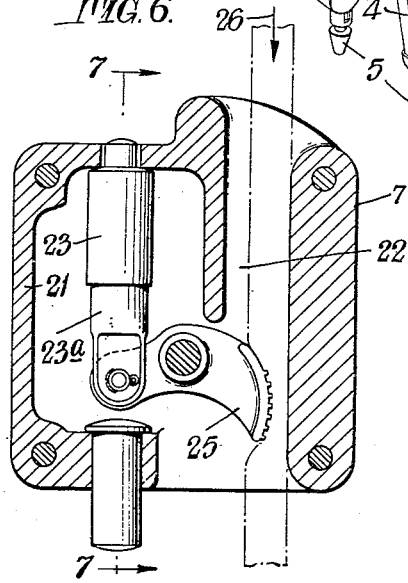
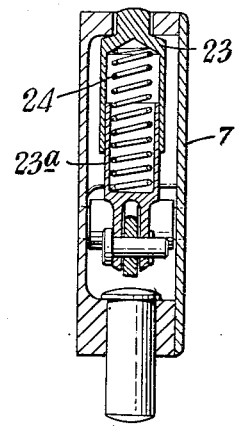
Inventor
JAMES MARTIN
per Worth Wade
Attorney.

May 27, 1958  J. MARTIN  2,836,382
LEG RESTRAINING MEANS FOR EJECTION SEATS FOR AIRCRAFT
Filed Nov. 18, 1953  5 Sheets-Sheet 3

Inventor
JAMES MARTIN
per Worth Wade
Attorney

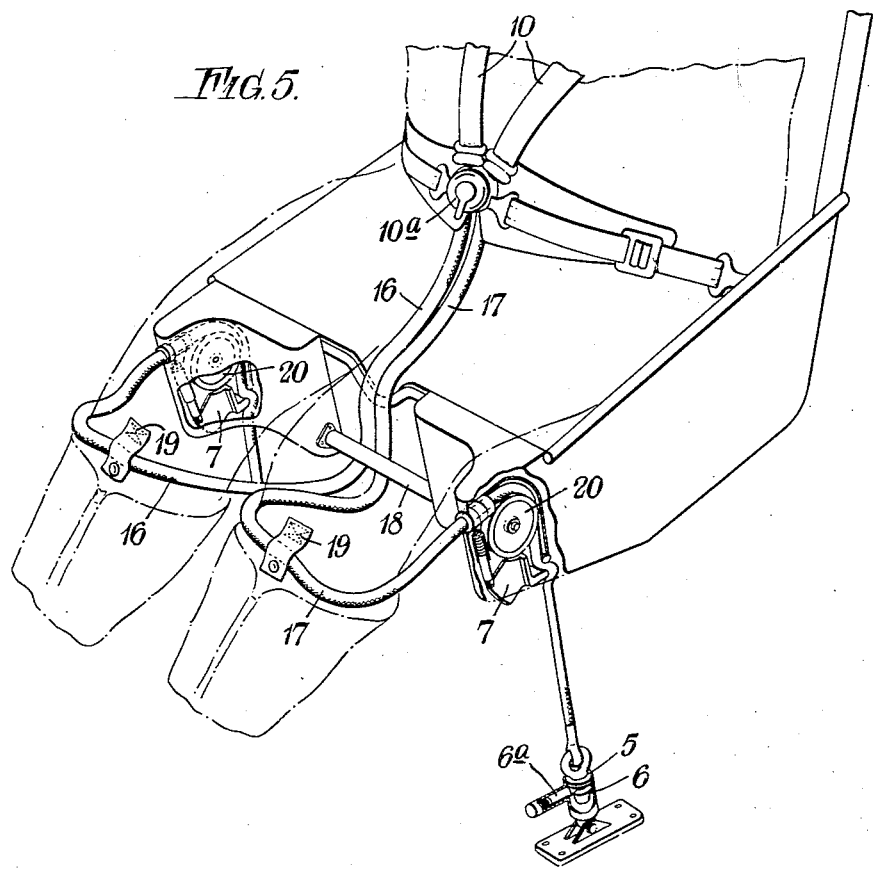

May 27, 1958     J. MARTIN     2,836,382
LEG RESTRAINING MEANS FOR EJECTION SEATS FOR AIRCRAFT
Filed Nov. 18, 1953     5 Sheets-Sheet 5

Inventor
JAMES MARTIN
per Worth Wade
Attorney

United States Patent Office 2,836,382
Patented May 27, 1958

2,836,382

LEG RESTRAINING MEANS FOR EJECTION SEATS FOR AIRCRAFT

James Martin, Higher Denham, near Uxbridge, England

Application November 18, 1953, Serial No. 392,977

Claims priority, application Great Britain March 4, 1953

1 Claim. (Cl. 244—122)

This invention relates to improvements in or relating to ejection seats for aircraft.

The invention is applied to ejection seats of the type which is adapted to be launched from an aeroplane or other aircraft with the occupant seated therein and mechanism is provided by which the seat is launched from the aircraft by means of an ejection unit actuated by an applied force, for example by pressure generated by one or more explosive cartridges.

One form of ejection seat to which the invention may be applied comprises a frame on which the seat is mounted, a guide adapted to be fixed in the aeroplane so as to be directed toward an outlet from which the seat may be ejected, an ejector gun operating between the seat frame and a fixed part of the aeroplane to eject the seat and its frame along the guide, a main parachute, a drogue, harness, harness release means, and means operable as the seat is ejected from the aircraft to carry out automatically and in correct sequence and timing the operations necessary to allow the pilot to descend on the main parachute. There is provided a blind or screen which is adapted to be drawn into position over the face of the occupant before, and to remain in position during, the launching of the seat and its occupant from the aeroplane. Means are provided interconnecting the blind or screen with the firing mechanism so that the act of drawing the blind or screen into position will actuate or release the firing mechanism by which the seat is launched.

Fixed or retractable thigh guards or wings have been used having as their aim to restrain the airman's legs from being blown apart or separated by the airstream or blast when the seat with its occupant is ejected from the aircraft.

A characteristic feature of the present invention is to provide a more positive restraint for the legs, during upward ejection since it has been found in prior practice that in certain instances it is possible for an airman to rise sufficiently in the seat to permit his thighs to rise above the thigh guards with the possibility that his legs may be torn apart by the airstream or blast so that extensive injury may occur.

The present invention comprises leg restraining means such as flexible lines or cables or a single line or cable hereinafter referred to as "lines," which are normally held during flight in a free or slack position over or around the legs below or/and above, the knee, giving unrestricted movement, and when the seat is ejected, means become effective so that the said leg restraining means are pulled taut around the legs bringing them away from the rudder pedals to be held firmly against the seat pan, but on the release of the safety harness on the airman abandoning the seat the leg restraining means are freed from the airman's legs. With such an arrangement the effects of negative "G" is counteracted.

The invention will now be described with reference to the accompanying drawings which illustrate examples of the carrying into effect of the invention.

In the drawings:

Fig. 2 is a view showing these leg restraining means pulled taut about the legs bringing them away from the rudder pedals to be held firmly against the seat pan, this action taking place when the seat is ejected or about to be ejected.

Figure 1:
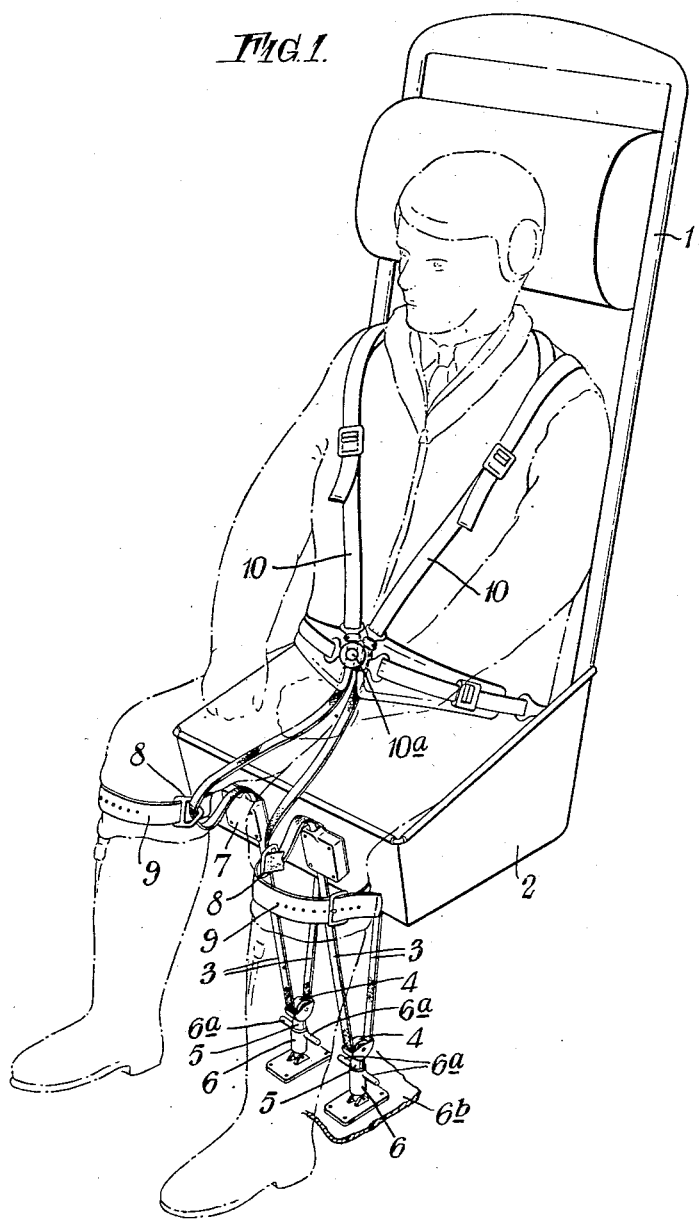
Fig. 1 is a view showing one form of leg restraining means in a free or slack position around the legs of an airman giving unrestricted movement to the airman whilst seated during normal flight.
Figure 3:
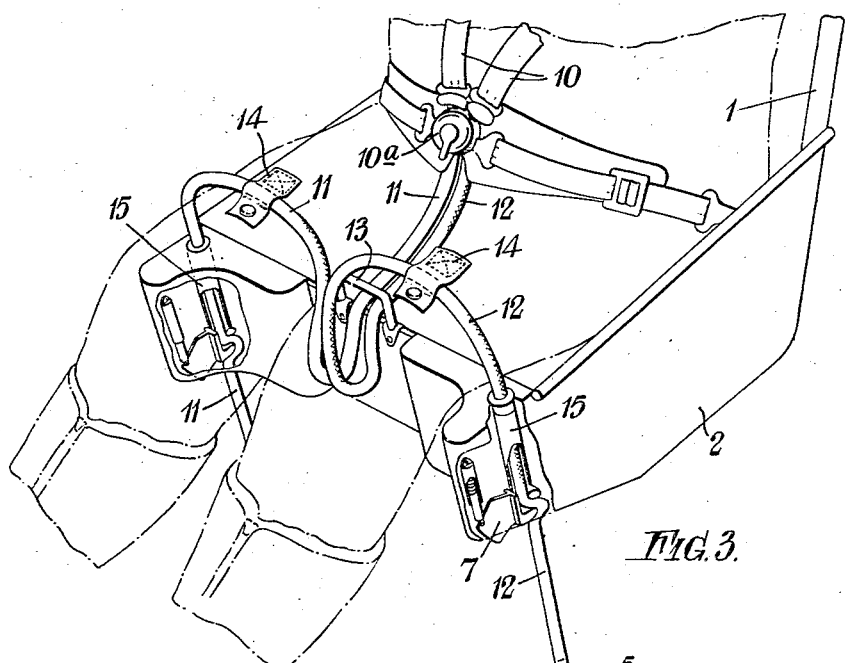
Figure 4:
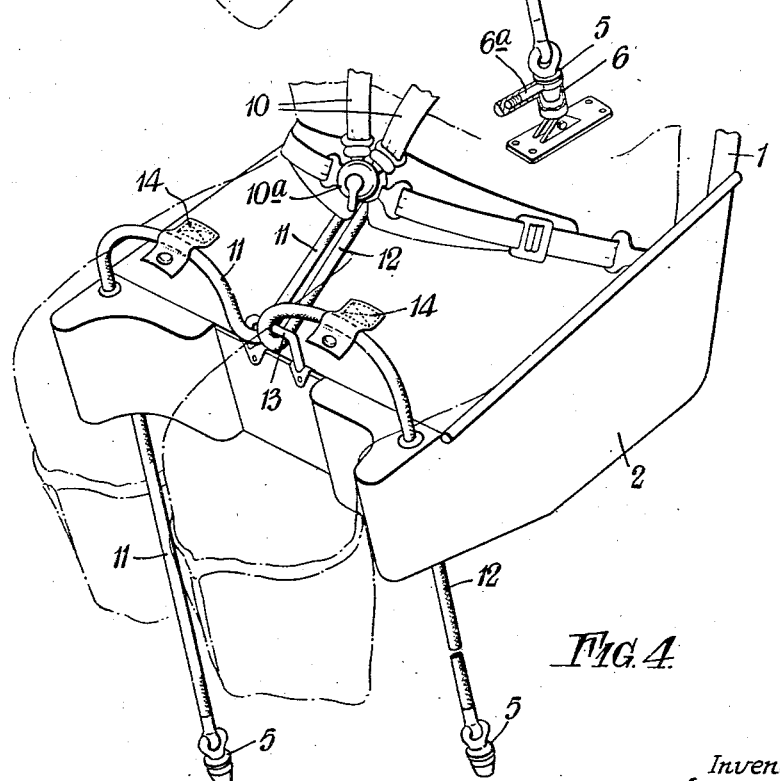
Figure 8:
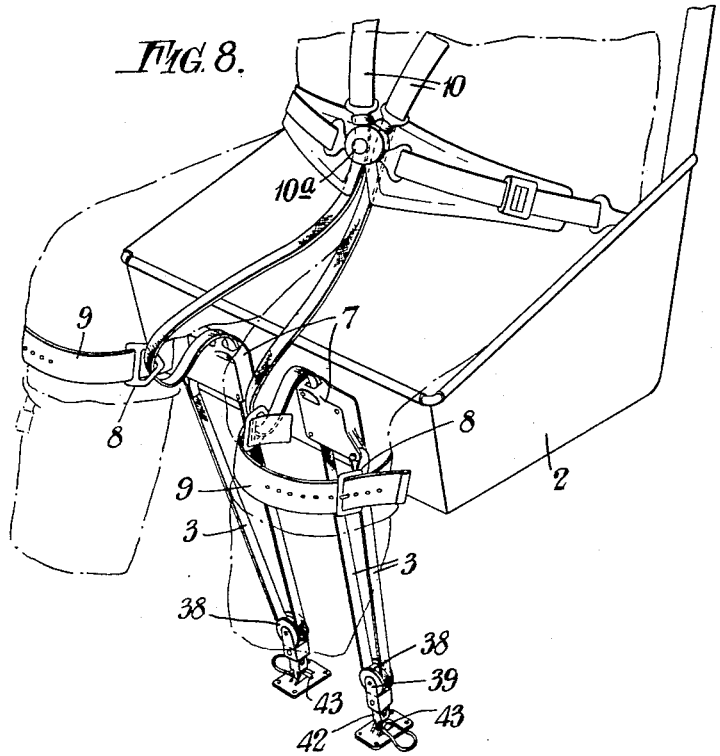
Figure 9:
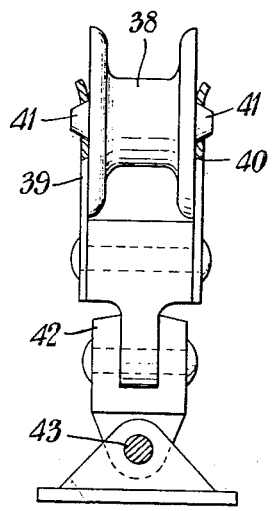

Figs. 3 and 5 are similar views to Fig. 1 and Fig. 4 is a similar view to Fig. 2 but showing modified constructions. Figs. 6 and 7 are side elevational views of a one-way clamp mechanism. Fig. 8 is a perspective view of another embodiment of the invention, and Fig. 9 is a side elevation of the means for attaching the straps shown in Fig. 8 to the floor of the cockpit.

Referring to the construction illustrated by Figs. 1 and 2, there is a seat 1 having a seat pan 2. The ends of flexible lines 3 are attached to the underside of the seat pan 2 and pass downward beneath rollers 4 which are mounted in plugs 5 which engage in sockets 6 which are attached by brackets to the floor 6b of the cockpit, the sockets 6 having spring catches 6a normally retaining the plugs in the sockets, the plugs being disengaged therefrom only at a predetermined load.

The lines 3 then rise each passing through one-way mechanisms or snub boxes generally designated by the reference numeral 7 attached to the seat. From the one-way mechanisms 7 the lines pass through ring-like members 8 attached to leg straps 9 and terminate finally in attachments to lugs on the lap strap of the harness 10, which lugs are releasably secured in the harness box 10a.

With this arrangement the force that can be applied to the legs is limited, since movement of the ring-like members 8 ceases when these contact the one-way mechanisms 7, thus reducing the risk of injury due to overtightening of the leg straps 9. Moreover by routing the lines under the rollers the legs are restrained in a very short time as there is a ratio pull of 2 to 1 as against a pull of 1 to 1 in some of the variant constructions hereinafter described.

As shown the leg straps are worn below the knee, but these may be supplemented by similar straps and ring-like members worn above the knee.

It has been stated previously that the lines 3 are normally slack enough to give unrestricted movement to the airman during normal flight. On ejection of the seat the lines will be tautened by the rising of the seat, thus pulling the airman's legs into and securing them in the best position. As the critical load is exceeded the plugs 5 will pull out of the sockets 6 on the floor of the cockpit.

When the airman abandons the seat and the safety harness is relased from the harness box 10a the attachments of the lines to the lugs thereof is automatically released thus permitting the lines to fall freely away and pass out of the ring-like members 8 of the leg straps 9.

In the construction shewn by Figs. 3 and 4, lines 11 and 12 are releasably attached to lugs on the safety harness 10. The lines 11 and 12 pass downwards between the airman's legs through a guide member 13 attached to the seat pan 2 and are thereafter looped and rise upwardly and separate, one line passing over each thigh part of the legs of the airman. The lines are located above the knees by passing beneath detachable loops 14 on the airman's flying clothing. The lines thereafter pass downwardly through conduits 15 in or on the seat pan and are attached finally to plugs 5 which engage in sockets 6 which are attached by brackets to the floor of the cockpit, the sockets having spring catches 6a normally retaining the plugs therein, the plugs being disengaged therefrom only at a predetermined load. The lines pass through non-return mechanisms 7.

It will be seen that the lines 11 and 12 are normally slack enough to give the airman unrestricted movement whilst seated. On ejection the lines 11 and 12 will be tautened by the rising of the seat, thus pulling the airman's legs into and securing them in the best position. As the critical load is exceeded the plugs will pull out of the sockets on the floor.

A further construction is shewn by Fig. 5. In this arrangement two lines 16 and 17 are releasably attached to lugs on the safety harness 10. The lines then pass downwards between the airman's legs and underneath a horizontal tube 18. From this point the lines 16 and 17 separate and pass over each leg of the airman where they are located by passing beneath detachable loops 19 on the airman's flying clothing. The lines 16 and 17 thereafter pass through non-return mechanisms 7 to attach finally to plugs 5 which engage in sockets 6 attached to the floor of the cockpit, the sockets having spring catches 6a normally retaining the plugs therein. Pulleys 20 may be embodied for reducing friction.

A suitable form of non-return mechanism 7 is illustrated by Figs. 6 and 7, the latter view being a section on the line 9—9 of Fig. 6. The casing 21 of the non-return mechanism has a through-way 22 through which the leg restraining line passes. Within the casing 21 is mounted a two-part cylindrical member 23, 23a, the latter part being adapted to slide in the part 23. Between the parts 23, 23a is a spring 24. A snubbing sprag or cam 25 is pivotally mounted within the casing 21. The part 23a is attached to one end of the sprag or cam 25 so that the spring is always acting to hold the sprag or cam in the position shown by Fig. 6, that is to say the snubbing sprag or cam is spring loaded. Thus the leg restraining line can travel freely in the direction of the arrow 26, but travel in the opposite direction is prevented by the action of the spring loaded snubbing sprag or cam.

Fig. 8 illustrates a construction comparable to Figs. 1 and 2 but modified in that another form of releasable connection to a part of the aircraft is used.

In this construction there is a seat 1 and seat pan 2. The ends of flexible lines 3 are attached to extensions of the snub boxes 7 and pass downwards beneath pulleys 38. The lines 3 then rise each passing through the snub boxes 7 and through ring-like members 8 attached to leg straps 9 and terminate finally in attachments to lugs on the safety harness 10, which lugs are releasably secured in the harness box 10a.

As shewn in Fig. 9 each pulley is mounted between a forked bracket having spring plates 39, 40, the pulley having a spindle with coned ends 41. The bracket is attached to the floor of the cockpit by a universal joint 42 so as to ensure correct alignment, the lower pin 43 serving as a quick release pin, so that when removing seat from cockpit for servicing the pin can be readily withdrawn to disconnect the pulley unit.

When a critical load is applied the plates 39, 40, are forced apart by the coned ends 41 of the pulley spindle thus freeing the pulley from the bracket.

In all the constructions unrestricted movement of the legs during the control of the aircraft, i. e., feet on rudder pedals, is made possible by an adequate length of strap, running freely, for example, through the buckles or ring-like members or the equivalent.

The invention is eminently suited in the case of downward ejecting seats especially with the addition of a second line passing over the airman's thighs as the restraint of the legs against upward acceleration is important with downward ejection seats.

It will be apparent that the invention can be variously modified and changed within the scope of the appended claim.

I claim:

In a pilot's ejection seat for an aircraft cockpit, the combination of a seat having a seat pan, harness for securing the pilot to said seat, a releasable catch on said harness for releasing the pilot from said seat, leg restraining means for the pilot's legs comprising a pair of lines having their upper ends releasably attached to said harness catch, a pair of releasable catches adapted to be positioned on the floor of the cockpit below the pilot, the lower ends of each of said lines attached to one of said floor catches, means positioned between the pilot's legs and attached to said seat for holding each of said lines in leg restraining position whereby when said seat is ejected said lines are first drawn taut to restrain movement of the legs away from the seat until the lower ends of said lines are released by said floor catches and thereafter the upper ends of said lines are released when said harness catch is released.

References Cited in the file of this patent

UNITED STATES PATENTS

| | | |
|---|---|---|
| 1,846,200 | Harvey | Feb. 23, 1932 |
| 1,891,418 | Hoffman | Dec. 20, 1932 |
| 1,898,090 | Lethern | Feb. 21, 1933 |
| 1,967,767 | Diez | July 24, 1934 |
| 2,036,953 | Morris | Apr. 7, 1936 |
| 2,432,125 | Schlaak | Dec. 9, 1947 |
| 2,528,532 | Martin | Nov. 7, 1950 |
| 2,574,178 | Haller | Nov. 6, 1951 |
| 2,591,875 | Robbins et al. | Apr. 8, 1952 |

FOREIGN PATENTS

| | | |
|---|---|---|
| 740,609 | Germany | Aug. 25, 1943 |